Jan. 13, 1942.  C. R. BUSCH  2,269,618
CAR TRUCK FOR BRAKE BEAMS OF CLASP TYPE
Filed May 24, 1938   3 Sheets-Sheet 1
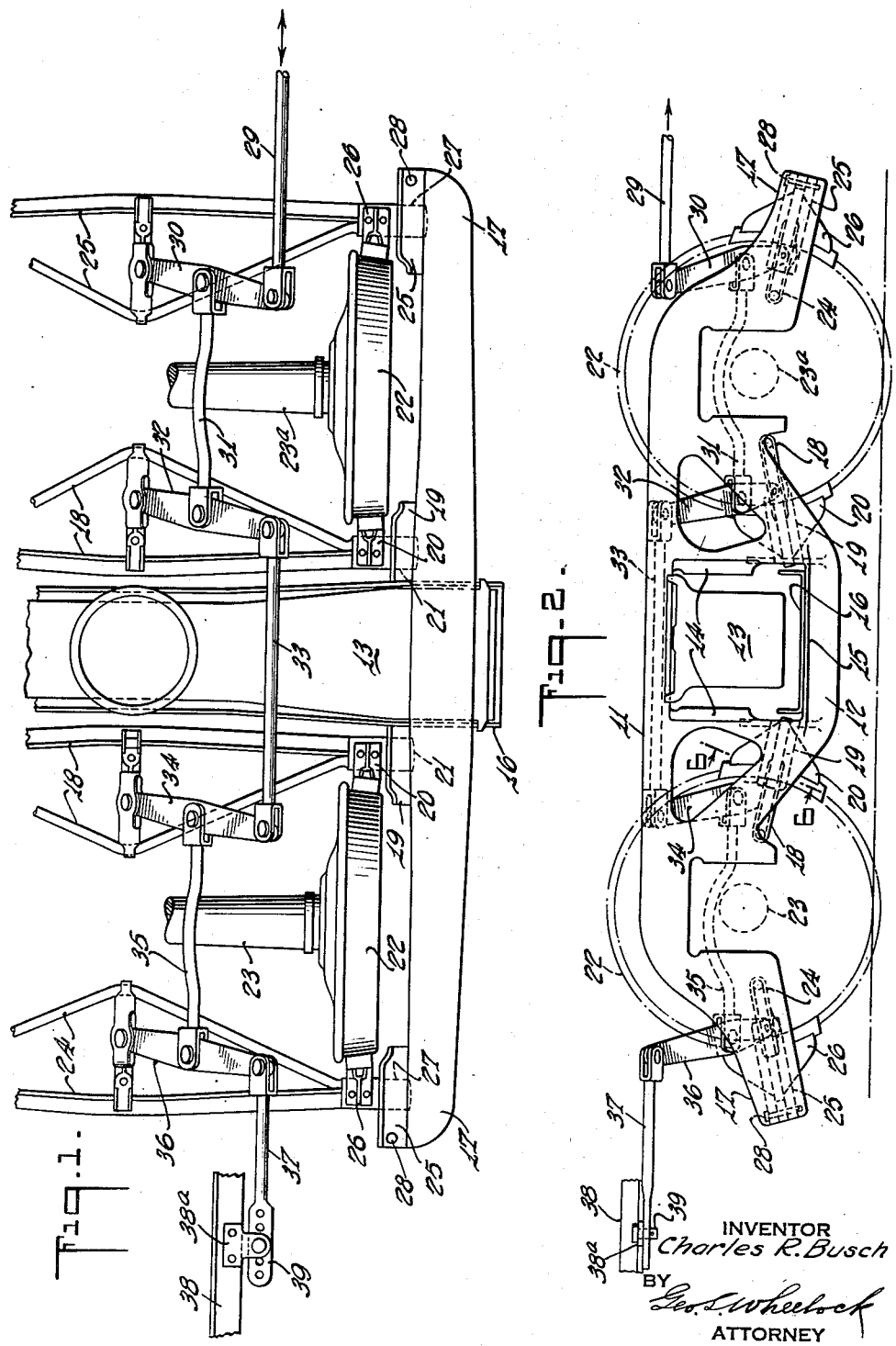
INVENTOR
Charles R. Busch
BY
Geo. L. Wheelock
ATTORNEY

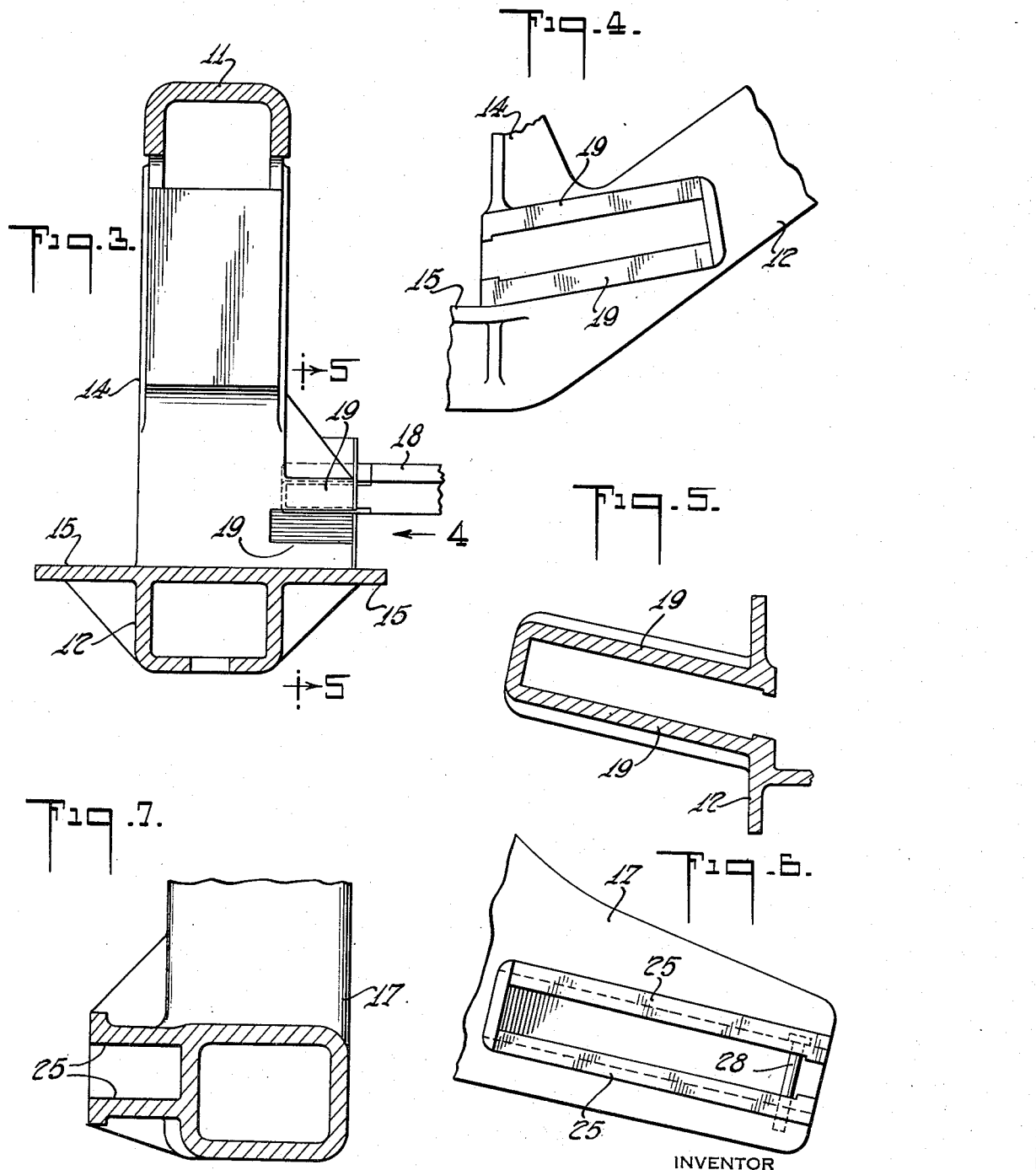

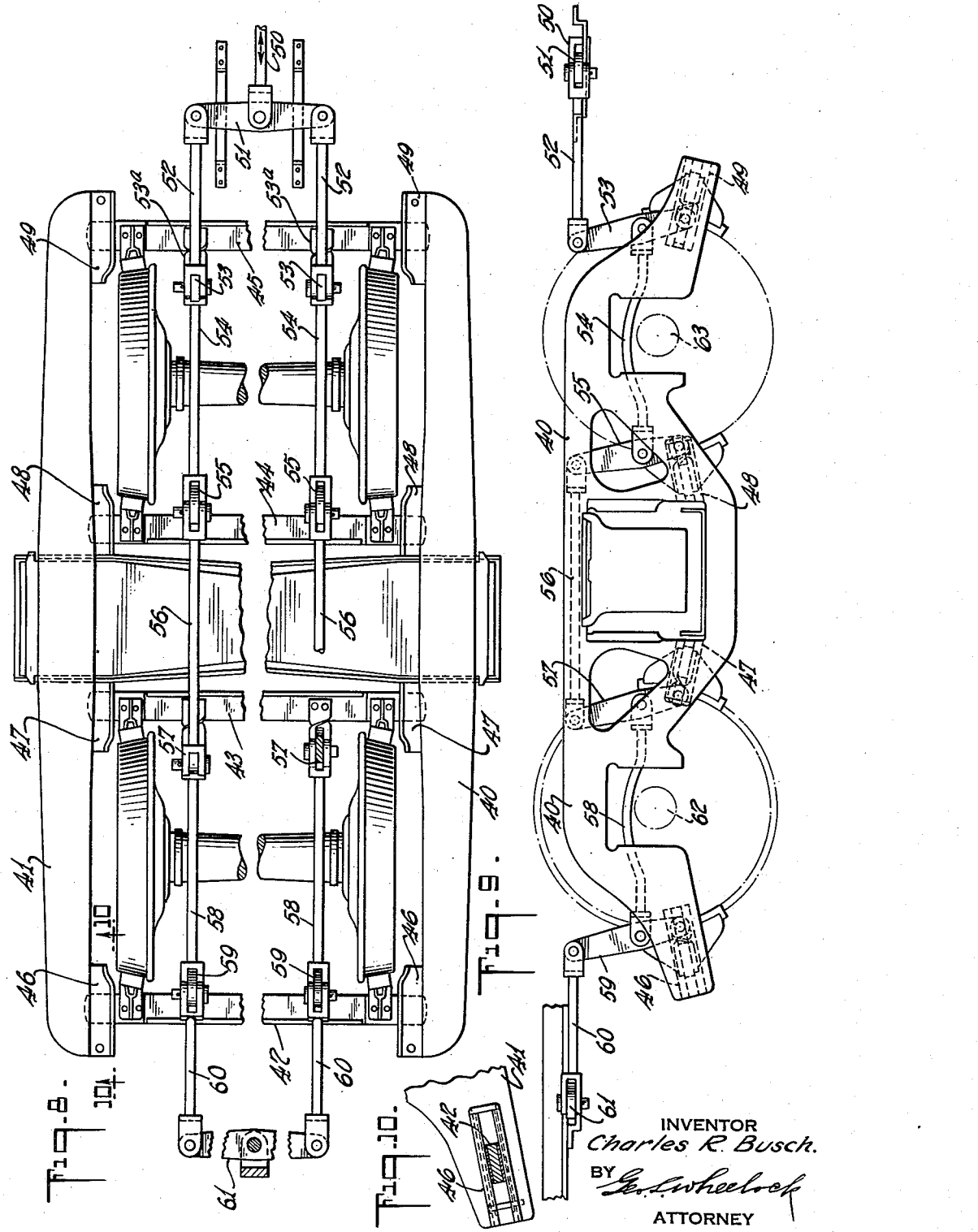

Patented Jan. 13, 1942

2,269,618

UNITED STATES PATENT OFFICE 2,269,618

CAR TRUCK FOR BRAKE BEAMS OF CLASP TYPE

Charles R. Busch, Orange, N. J., assignor to Buffalo Brake Beam Company, New York, N. Y., a corporation of New York Application May 24, 1938, Serial No. 209,679

13 Claims. (Cl. 188—212)

This invention relates more particularly to car trucks for the clasp type of brakes and is a further development of the improvements disclosed and claimed in my application filed March 15, 1937, Serial No. 130,881, now Patent No. 2,170,112 issued Aug. 22, 1939, and in subsequent applications some of which are divisions of said application.

The principal object of the present invention is to provide a high speed truck preferably having all parts of unitary design, and wherein the foundation brake gear is interlocked in the truck frame, and whereby to provide safety, reduce the number of parts to a measurable amount, possibly to the extent of one hundred and fifty or more, and to provide a more efficient brake gear as fewer parts are used so as to reduce the frictional surfaces. By using four brake beams per truck instead of two beams as specifically disclosed in my aforesaid application, the brake shoe pressure is reduced by one-half for each brake shoe, and this is advantageous in that the degree of heat is reduced in the wheels and shoes as compared with the wheels and brake shoes of other trucks employing brakes of the clasp type. Furthermore the tendency of the brake to unseat the axle bearing is eliminated where high pressures are used on the brakes.

The above and other objects are accomplished through the medium of the invention herein disclosed.

In order that the invention herein described and claimed may be more fully understood, the same is illustrated by the accompanying drawings wherein Fig. 1 is a plan of the improved truck with one side of the truck broken away, and showing one type of brake operating mechanism having a single series of live and dead levers;

Fig. 2 is a side elevation of the same, the car wheels and axles and also parts of the brake operating mechanism being shown in broken lines;

Fig. 3 is an enlarged vertical section through the middle portion of the car truck side frame shown in Figs. 1 and 2 and showing one end of the brake beam;

Fig. 4 is a broken detail elevation as viewed in the direction of the arrow 4, Fig. 3;

Fig. 5 is a section on the line 5—5, Fig. 3;

Fig. 6 is a broken elevation of one of the end extensions of the improved car truck side frame looking towards its inner side;

Fig. 7 is a transverse section of Fig. 6;

Fig. 8 is a broken plan of the improved car truck showing the same adapted for and used with clasp brake mechanism including two series of live and dead levers;

Fig. 9 is a side elevation of Fig. 8; and

Fig. 10 is a detail elevation on the line 10—10, Fig. 8, looking in the direction of the arrows.

Referring to Figs. 1 and 2 each side frame of the truck is similar to the side frame 11, 12 of which the compression member is 11 and the tension member is 12. The bolster 13 will be mounted as usual upon springs not illustrated and is guided by the guide columns 14, one at each side of the window in the side frame, and the seats 15 for receiving the downward thrusts of the bolster are preferably used to support a spring plank 16, which however may be omitted if desired.

As contrasted with the truck for inside hung brake beams more particularly disclosed in my aforesaid application, each of the side frames herein is provided at the ends with more or less longitudinally projecting extensions 17 preferably integral therewith, one to project away from the truck to one side of the journal box which is not illustrated and the other to project in opposite direction away from the other journal box which is also not illustrated, whereby the truck when having a pair of such side frames is adapted to receive the clasp brake type of braking mechanism.

The two intermediate brake beams 18 are preferably of truss type, each having a tension member and a compression member to move in inclined guides, each preferably formed by a pair of ribs or flanges 19, there being one pair at each side of the window opening of the side frame preferably as disclosed in my aforesaid application. The recess between the flanges 19 is preferably closed at the upper ends of the flanges, the closed end in Fig. 5 being shown in section as the section is taken on Fig. 3 at a point quite near to the side frame. However, in Figs. 4 and 6 the closed end is set back from the inner edges of the flanges, as the latter are inwardly offset at their upper ends as shown in Fig. 1 to provide clearance permitting of the lateral approach of the adjacent car wheel towards the side frame. A brake head 20 is preferably rigidly mounted on each end of a brake beam 18, and such ends are extended sufficiently beyond the brake heads so as to provide preferably broad flattened extended ends which are received and guided in the grooves formed between the ribs or flanges 19. These guides are more completely shown in Figs. 3, 4 and 5.

Referring to Fig. 2 it will be seen that the flanges 19 are arranged so that at both sides of the spring seat 15 they incline upwardly therefrom. The car wheels 22 are mounted in the usual manner on axles 23, 23a, between the side frames and it is preferred that the planes lengthwise of the guides be arranged at an angle of twelve degrees to the horizontal, and so that the lines along which the brake beams are moved will intersect the axes of the respective axles 23, 23a. Hence the guides 19 for the two brake beams 18 will incline in opposite directions to the horizontal, as fully disclosed by my said application and others.

Each truck side frame is preferably made as a casting and the brake beam guides 19 or the like are preferably cast integrally therewith. However, each truck side frame can be built up from plates riveted or welded together, and the brake beam guides rigidly mounted thereon or formed therewith so as to extend along proper lines, preferably intersecting the car wheel axes.

In Figs. 1 and 2 additional suitable brake beams 24 are illustrated, for completing the four beam units which are included in the clasp brake type of mechanism. These are of course located outwardly of the car wheels 22, while the brake beams 18 are located inwardly thereof. Ribs or flanges 25, shown more in detail in Figs. 6 and 7, are provided on each outwardly extended end 17 of each car truck side frame and integral therewith, and these are mainly similar to the ribs or flanges 19 which form the guides for the beams 18. However, these ribs 25 are inclined in opposite direction from each other at the ends of the side frame, so that the four series of guides for the brake beams will alternately incline in opposite directions from end to end of the car truck. In other words, the inclination of the guides at each end of the side frame is preferably at twelve degrees to the horizontal so that they extend along lines which intersect the axis of the adjacent car wheel axle, whereby the guides for the two beams of a given pair of car wheels will both be inclined in opposite directions from each other and will preferably extend along lines so that both intersect the axes of such car wheels. The ribs 25 also reinforce the end extensions 17. In addition, by casting each side frame in one piece so that the forwardly and rearwardly projecting extensions and the guides 25 are integral with the frame, it is assured that the beams will always be guided at the required inclination, as the operation of the beams on the guides cannot move them away from the degree of inclination at which they were originally set.

Brake heads 26 are rigidly mounted upon the ends of each brake beam 24 and each is provided at opposite ends with a preferably flattened extension or end 27 beyond each brake head, so that the beam can be received between and guided by the ribs or flanges 25.

While at the middle portion of the car truck the spring plank 16, if present, or the spring seats 15, if the spring plank is absent, is adapted to constitute a stop to prevent either brake beam 18 from falling to the track, in the case of the brake beam guide of each end extension 17, a removable stop 28 is provided which preferably is located at the outer end of the guide and may be in the form of a headed pin which passes through the ribs 25 and may be held in position by the ordinary cotter pin.

After either one of the beams 24 is placed in the guides 25, the stop pins, such as 28, are placed in position, but if it is desired to remove such beam the stop pins 28 are removed. However, the corresponding end of each guide may, if desired, be closed permanently. Should each side frame be built up of plates riveted or welded together, the guides could be formed on the frame by either flanging out the same or be riveted or welded thereto.

It will be understood that if a spring plank is omitted, the ends of the bolster 13 interlock with the side frame column guides 14 and hold the frames together. Preferably the side frame is provided with wear plates or the like located in the guides and of high tempered metal so as to minimize wear caused by friction between the ends of a beam and the guides.

When the brake beams are of the truss type for use in the clasp brake type of brake operating mechanism, the latter is usually constructed as follows: The pull rod 29 from the power cylinder is pivotally attached to the upper end of live lever 30 which at its lower end is pivotally connected with the strut of the adjacent brake beam 24 and said lever 30 is pivotally connected by a rod 31 with live lever 32, such lever being pivotally connected with the adjacent brake beam 18. The upper end of live lever 32 is pivotally connected by a rod 33 with the upper end of live lever 34, the two levers 32, 34 being located at opposite sides of bolster 13 and the connecting rod 33 passing over the bolster. Live lever 34 is pivotally connected at its lower end with the adjacent brake beam 18 and such lever is in turn pivotally connected by rod 35 with dead lever 36. Lever 36 is pivotally connected with the adjacent brake beam 24 and its upper end is connected by a rod 37 with bracket 38a, which is mounted on the center sill 38 of the car body, by adjustable means 39, so that the size of the rod 37 may be smaller than if it was attached to the bolster.

It will be noted that the connecting rods 31, 35 pass over the car wheel axles 23, 23a, and as the rod 33 passes over the bolster, each such rod is prevented from falling to the track in the case of a lost brake pin.

It will be seen that by employing a unit truck and unit brakes that the system of brakes is very simple, and that such parts as brake hangers, brake beam and bottom rod supports and equalizing levers are dispensed with. Due to the fact that each beam is operating on an incline and is subject to gravity release, such parts as adjustable heads and mechanical releases are not required. As the brake levers are all of the same length each brake beam will have the same pressure on the wheels when power is applied.

Referring to Figs. 8, 9 and 10, the same side frame construction 40, 41 is illustrated as in Figs. 1 to 7 inclusive, but here the trussed type of brake beam is displaced by T-beams 42, 43, 44 and 45. The lever system is the same as previously described, except that equalizing means are utilized.

Each side frame 40, 41 is provided with a series of four guides 46, 47, 48 and 49 constructed and arranged preferably as previously described, so that the extended ends of the T-beams may be guided by the said frames.

Pull rod 50 is pivoted to equalizing lever 51 suitably supported by the car body, and the ends of such lever are pivoted to the adjacent ends of the pair of connecting rods 52 which are pivoted at their other ends to the upper ends of a pair of live levers 53. The lower ends of the live levers 53 are pivoted to brackets 53a mounted rigidly on the brake beam 45 and which are arranged close to the brake heads so that a truss beam is not required. A pair of connecting rods 54 pivotally connects the live levers 53 with the live levers 55 at the opposite side of the car wheel axle and the lower ends of levers 55 are pivotally connected with the brake beam 44 similarly to the live levers 53. The upper ends of the live levers 55 are pivotally connected by means of a pair of rods 56 with the upper ends of a pair of live levers 57, which are pivotally connected with the beam 43 in the manner previously described. A pair of connecting rods 58 pivotally connects the live levers 57 with a pair of dead levers 59 located at the opposite side of the adjacent car wheel axle. The lower ends of dead levers 59 are pivotally connected with the brake beam 42 in the manner previously described and the upper ends of the same are pivotally connected by a pair of rods 60 with an equalizing lever 61 which is pivotally mounted on the car body.

When power is applied to the pull rod 50, the brakes are applied to the car wheels, and when the power is released the brake beams are moved in opposite direction, and at all times the four brake beams 42, 43, 44 and 45 are guided upon the side frames 40, 41. Here also the inclination of the respective guides 46, 47, 48 and 49 is such that each brake beam will move on a line which preferably intersects the axis of the car wheel axles 62, 63.

It will be obvious to those skilled in the art that the invention as shown and described is susceptible to more or less modification and still be within the scope of the appended claims.

What I claim as new is:

1. A side frame for a clasp brake type of car truck, wherein end extensions of the frame are provided, each extension having an inclined brake-beam guide along its inward side, the plane of inclination to intersect the axis of an adjacent car wheel.

2. A side frame for a clasp brake type of car truck, wherein end extensions of the frame are provided, each extension having an inclined brake-beam guide along its inward side, the plane of inclination to intersect the axis of an adjacent car wheel and such plane extending at an angle of 12 degrees with respect to such axis.

3. A side frame for a clasp brake type of car truck, wherein central bolster guiding columns and downwardly inclined end extensions of the frame are provided, the frame at the base of each guide column and its extensions having oppositely inclined brake-beam guides beyond the center of the frame so as to provide four such guides.

4. A side frame for a clasp brake type of car truck, wherein end extensions of the frame are provided, the middle portion of the frame having oppositely upwardly inclined brake-beam guides and the extensions having oppositely downwardly inclined brake beam guides, the planes of inclination to intersect the axes of the car wheels.

5. In a car truck, the combination of side frames of the type for supporting clasp-brake mechanism, brake-beams, two of which beams are at the middle of the truck and two at the ends of the truck, and four guides on each of the frames for supporting and guiding the beams at both sides of each car wheel axis, four of all of the guides at the ends of the truck, and all of such guides being oppositely inclined beyond the center of each frame and also with respect to each car wheel axis, and stop means at the lower end of each guide for confining each beam, the stops at the ends of the truck being movable to release the two end beams.

6. A side frame for a clasp brake type of car truck, wherein oppositely downwardly inclined end extensions of the frame are provided, the middle portion of the frame having oppositely upwardly inclined brake-beam guides and the extensions having brake beam guides oppositely downwardly inclined with respect to and below the axes of the car wheels and terminating at the lower ends of the extensions.

7. In a car truck, the combination of side frames of a clasp-brake type of car truck, wherein end extensions of the frames beyond the axles are provided, trussed brake-beams having compression and tension members terminated by transversely flat ends arranged substantially in the planes of the trusses and providing broad bearing surfaces, and guides on the inner sides of said extensions between their edges, said guides being slidably engaged by the flat ends when the beams are operated.

8. In a car truck, the combination of side frames of the type for supporting clasp-brake mechanism, each frame having a tension member and a compression member and forwardly and rearwardly projected end extensions, brake beams, and four guides on each of the frames, two of the guides located on each tension member and two on the end extensions, and said four guides of each frame supporting and guiding the beams at both sides of each car wheel axis, such guides being oppositely inclined beyond the center of each frame and also downwardly with respect to each car wheel axis.

9. A side frame for a clasp brake type of car truck, wherein end extensions of the frame integral therewith are provided, each extension having a brake beam guide along and integral with its inward side, and each of which guides is inclined downwardly with respect to the axis of the adjacent car wheel, each such guide adapted to extend from a point laterally of the tread of the adjacent car wheel to a point substantially beyond the wheel, and the integrality of all such parts maintaining the guides at a constant inclination to insure proper guidance of the brake beams at all times.

10. In a railway car truck, spaced side members having end and intermediate guide-ways on the inboard faces thereof, a connecting load-carrying member, supporting wheel and axle assemblies and clasp brake rigging including brake beams supported on opposite sides of each assembly, extensions formed at opposite ends of each beam and received in the adjacent guide-ways for supporting said rigging, said guide-ways at opposite sides of each wheel being oppositely inclined relative to the longitudinal axis of said truck, and means preventing disengagement from said guide-ways of said beams at the ends of said truck in case said last-mentioned beams become disconnected from said rigging.

11. In a four-wheel railway car truck having clasp brakes including brake beams supported at opposite sides of each wheel, truss side frames, each including tension and compression members merging adjacent their ends with integral journal box guides, integral columns forming with said tension and compression members bolster openings, a bolster extending between said openings, brackets on said side frames outwardly of said guides, diagonally-arranged slots supported on said brackets outwardly of the wheels, other diagonally-arranged slots supported on said side frames adjacent the junctures of said tension member and columns and intermediate the wheels, said slots intermediate the wheels affording support for the ends of brake beams intermediate the wheels, and said slots on said brackets affording support for the ends of brake beams outwardly of the wheels.

12. In a four-wheel railway car truck having clasp brakes including brake beams supported on opposite sides of each wheel, a framework comprising spaced side frames and a transverse load-carrying member, each of said side frames comprising a central bolster opening and brackets at each extremity, said brackets affording diagonally-arranged slots outwardly of the wheels as supporting means for the end brake beams, other diagonally-arranged slots adjacent the bolster opening affording support means for the beams intermediate the wheels, each of said beams having at its opposite extremities means receivable in the adjacent slots, and the slots at opposite sides of each wheel being alternately inclined relative to the longitudinal axis of said truck.

13. In a four-wheel railway car truck having clasp brakes including beams supported at opposite sides of each wheel, side frames each having integral guide columns defining a bolster opening and wheel guides for cooperation with spaced wheel and axle assemblies, a bolster extending between said frames, brackets on said frames outwardly of said wheel guides, diagonally-arranged slots supported on said brackets outwardly of the wheels, and other diagonally-arranged slots supported on said frames intermediate the wheels adjacent said integral columns, said slots affording support for the ends of adjacent brake beams, said slots at opposite sides of each wheel being reversely inclined relative to the longitudinal axis of the truck.

CHARLES R. BUSCH.